May 24, 1938.  S. WISE  2,118,126
LOCK FOR BICYCLES AND OTHER PURPOSES
Filed Nov. 25, 1936    2 Sheets-Sheet 1
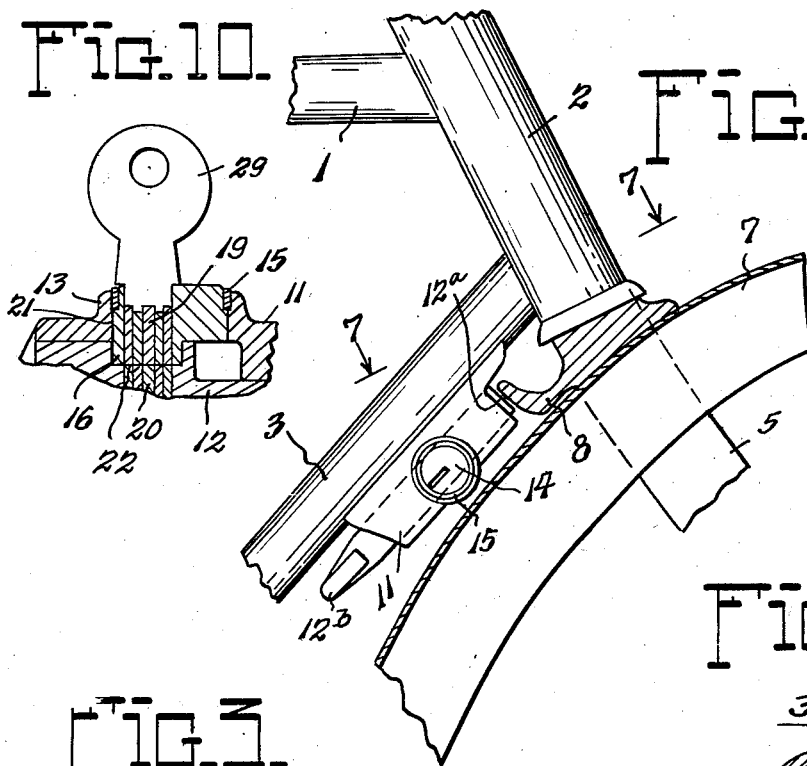
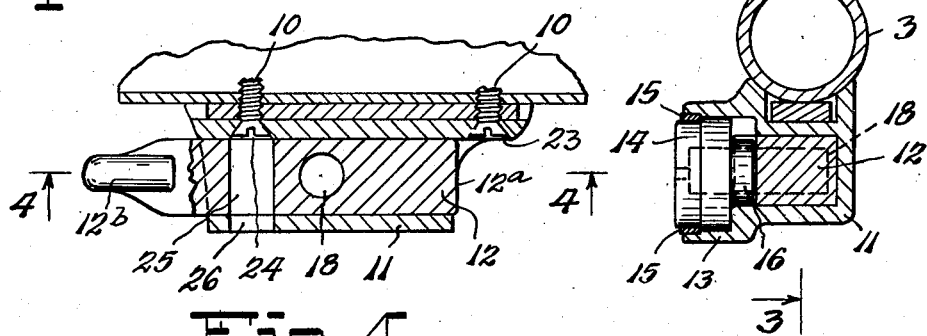
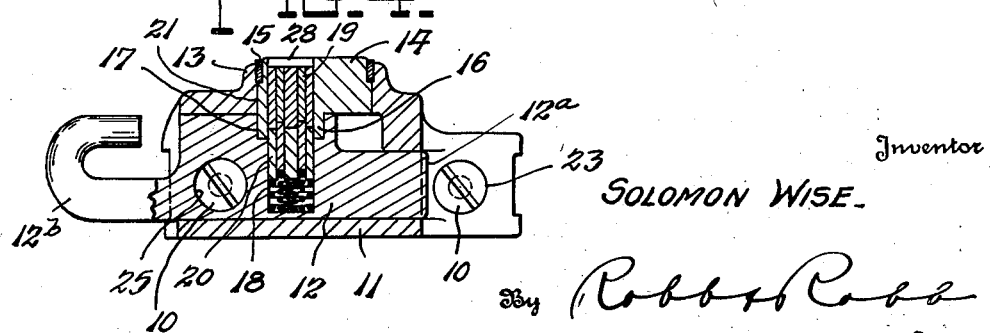
Inventor
SOLOMON WISE
By Robb & Robb
Attorneys May 24, 1938. S. WISE 2,118,126
LOCK FOR BICYCLES AND OTHER PURPOSES
Filed Nov. 25, 1936 2 Sheets-Sheet 2
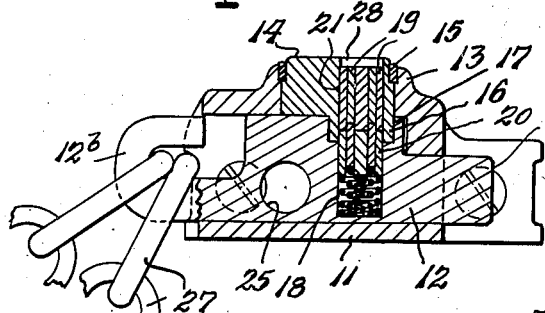
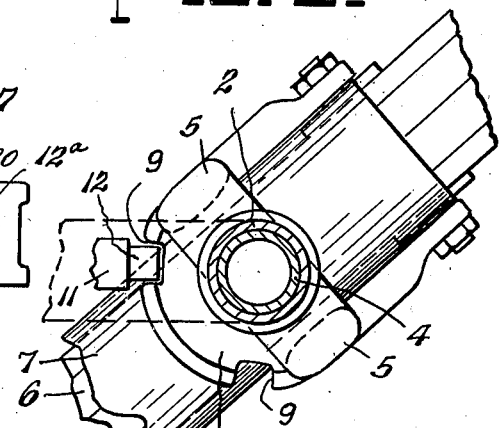
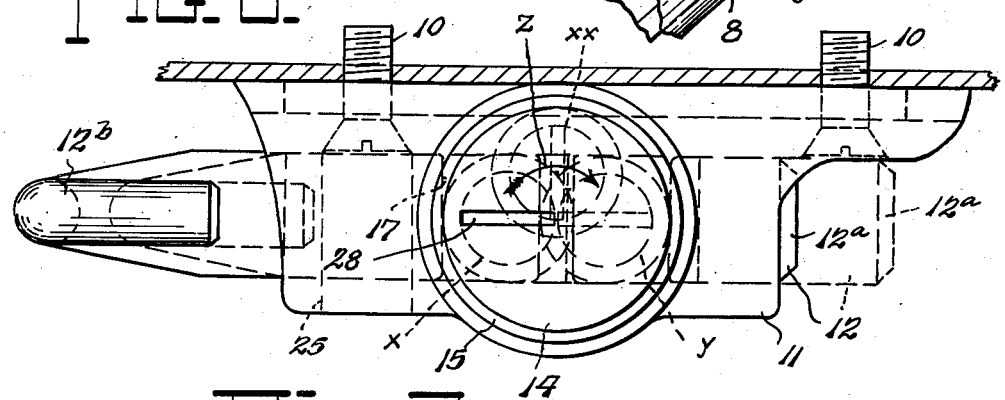
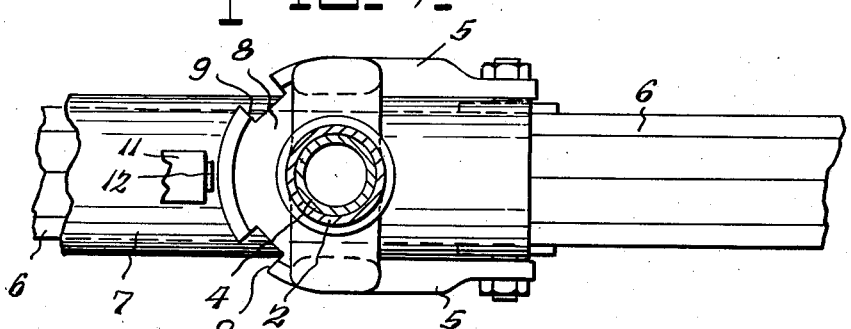
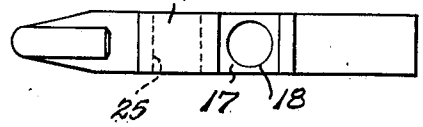
Inventor
SOLOMON WISE
By Robert Cobb
Attorneys Patented May 24, 1938

2,118,126

UNITED STATES PATENT OFFICE 2,118,126

LOCK FOR BICYCLES AND OTHER PURPOSES

Solomon Wise, Shaker Heights, Ohio

Application November 25, 1936, Serial No. 112,770

8 Claims. (Cl. 70—234)

The object of this invention has been to produce a simple, compact, and uniquely novel form of lock unit, particularly advantageous for installation as a permanent feature of bicycle construction for performing a locking function in relation to some part of the bicycle and having the additional function of being used in connection with a chain or flexible part or band-like connector for anchoring the bicycle to a post or some permanently fixed part.

While the invention is described and shown in this application in its particular adaptation for bicycle use, by slight modification of the casing construction for the lock mechanism and employment with the same of any desired cooperating part to be engaged by the lock bolt, the invention may be adapted to any use where a sliding lock bolt is desired or required.

In the carrying out of my invention, my lock unit involves the employment of a peculiarly mounted movable actuator in the form of a rotator equipped with a throw pin for effecting the shifting or sliding movement of the lock bolt. The throw pin performs a double function in that it not only engages and actuates the slide bolt of the unit when the rotator is operated, but it carries certain tumblers of a tumbler unit, which tumblers cooperate with other tumblers carried by the lock or slide bolt. The construction of the throw pin and its cooperation with the tumbler mechanism and the lock bolt constitute especially new features of the invention.

My invention involves other detail features of construction which will appear more fully upon reference to the following description in conjunction with the annexed drawings, in which—

Figure 1 shows the adaption of the invention to use upon a bicycle, the lock bolt being illustrated in its inoperative position, the coacting lock member of the steering post being shown in section.

Figure 2 is a cross sectional view through the lock casing, showing its manner of mounting upon the inclined tubular frame bar of the bicycle and bringing out clearly the mounting of the rotator and throw pin thereof.

Figure 3 is a longitudinal sectional view taken about on the line 3—3 of Figure 2, the hook end of the lock bolt shown in elevation.

Figure 4 is a horizontal sectional view taken about on the line 4—4 of Figure 3, and showing the lock bolt locked in its inoperative position.

Figure 5 is a view similar to Figure 4 but illustrating the parts as when the lock bolt is locked in its operative position.

Figure 6 is an enlarged side view of the lock unit alone, dotted lines illustrating the extreme opposite positions which may be assumed by the throw pin, in which positions the tumbler mechanism will lock the lock bolt; also showing the throw pin in one of its positions intermediate the extreme positions mentioned, wherein the tumbler parts are so adjusted as to permit the free shifting of the lock bolt either to an operative locking position or an inoperative position, and upon assuming either of such positions the tumbler devices will automatically lock said bolt from movement.

Figure 7 is a cross sectional view on the line 7—7 of Figure 1 through the steering column of a bicycle, illustrating the front fork and front wheel, as well as the guard and fender for the latter, certain parts broken away; also showing the lock sector which is carried by and rotated with the steering post, said sector having notches in either of which the lock bolt may engage in order to lock the front wheel in an angular inoperative position respecting the frame, preventing the use of the bicycle by which the invention may be carried.

Figure 8 is a view similar to Figure 7, illustrating how the front wheel is locked in its offset or angular position just referred to.

Figure 9 is a detail view of the lock bolt.

Figure 10 is a partial sectional view of the lock shown in Figure 4 with the key inserted and the tumblers positioned for unlocking operation.

In the drawings, according to the illustration of the invention as adapted for bicycle use, a portion of the frame of the bicycle is shown in Figure 1 as including the horizontal bar 1, steering column 2 and the inclined frame bar 3, all of conventional construction as found in ordinary bicycles. The steering post with which the handle bars of the bicycle are connected is designated 4, carries the front forks 5 for the front wheel 6, and also supports the front fender or guard 7 for the said wheel 6. In order to adapt the lock unit of the invention to this type of bicycle construction, the steering post 4 will be equipped with a lock sector 8 fixed thereto and seen best in Figures 1, 7, and 8. The lock sector is provided with notches 9 located out of line with the plane of the frame of the bicycle and said member 8 of course turns with the steering post 4 to which it is fixed. The locking function of the member 8 will appear more fully hereinafter. Mounted upon the inclined frame bar 3, and attached thereto by means of screws 10, see Figure 3, is the lock casing 11. This casing is of somewhat long construction and its hollow portion constitutes a slideway for the lock bolt 12. The lock bolt 12 has an end 12a adapted to engage in either of the notches 9 of the sector 8, and its opposite end 12b is formed into a hook for cooperation with a chain or flexible member, or some band-like attaching part that may be passed around a post or any fixed member with a view to securing the bicycle thereto in locked condition, as more fully hereinafter presented.

At one side thereof the casing 11 is formed with a round boss 13 projecting slightly therefrom and said boss is hollow in order to receive the movable actuator 14 which comprises virtually a circular rotator designed for moving the slide bolt 12 longitudinally in opposite directions in the casing 11. The rotator 14 is concentric within the boss 13 and is prevented from displacement therefrom by means of a locking ring or washer 15. Offstanding inwardly from the rotator 14 which is of somewhat disc-like formation is an eccentric throw-pin or stud designated 16, and this throw pin or stud is adapted to engage in a recess 17 formed in one side of the lock bolt 12.

Leading into the lock bolt body from the recess 17 aforesaid is the tumbler recess or hole 18. The tumbler mechanism used in conjunction with my lock is of the concentric tumbler or cylinder type shown and described in my Letters Patent 1,390,222, granted September 26, 1921, and my Letters Patent 1,597,560, granted August 24, 1926. In view of the disclosures in said prior patents, it is not necessary to describe the tumbler mechanisms in detail, other than to say that there are employed an outer series of concentric tumblers 19 which are mounted in the hollow portion of the throw pin 16 and cooperate with other concentric cylinders or tumblers 20 that are carried in the tumbler recess 18. Practically speaking, it may be stated that the hollow portion of the throw pin 16 merges into a recess 21 in the rotator 14 or constitutes a continuation of the latter, and the two form a tumbler barrel just as the recess 18 in the lock bolt 12 forms a tumbler barrel. When the coacting ends of the tumblers 19 and 20 are caused to become aligned, or caused to be moved by a key so that said coacting ends are in the line of cleavage designated 22 between the inner side of the rotator 14 and the adjacent side of the bolt 12, the rotator 14 is free to be rotated. The operation of the tumblers 19 and 20 in connection with the above adjustment is quite the same in principle as set forth in my previous Letters Patents hereinbefore identified.

In Figure 4 the tumblers 19 and 20 are in their locking positions preventing movement of the member 14, and the bolt 12 is locked thereby in its inoperative or inactive position. On the contrary, in Figure 5 the tumblers 19 and 20 in their locking positions maintain the bolt 12 locked in its operating position so that its opposite ends may function for locking purposes.

The screws 10, in securing the casing 11 in place on the part 3 as described, pass through openings 23 and 24 of the inner wall or side of the casing. The screw 10 passing through the opening 24 is accessible to be applied and removed through an opening 25 extending entirely through the lock bolt 12 and through an opening 26 in the outer wall of the casing 11, which openings 25 and 26 register when the lock bolt 12 is in its inoperative position. The opening 23, through which the other screw 10 passes, and said screw, are accessible also when the bolt 12 is in its inoperative position. At such time the screws 10 may be removed or emplaced for the detachment of the lock unit comprising the casing 11 and associated parts.

But when the lock bolt 12 is shifted to its locking position, as seen in Figure 5, it will be evident that the opening 25 moves out of register with the opening 24 so the adjacent screw 10 is not accessible and the engaging end 12a of the bolt 12 extends over the head of the other screw 10, passing through the opening 23, and over said opening, so that the said screw 10 is inaccessible for removal at such time.

With the construction of the invention understood as above set forth, the operation is as follows. We will assume that the parts are in the position of Figures 3 and 4, that a chain 27 has been passed around a post or the like, and its ends engaged with a hook 12b of the bolt 12, and the steering post 4 has been turned by the handle bar or grasping the wheel 6 to a position substantially as shown in Figure 8. A key will be introduced into the key slot 28 at the outer closed end of the rotator 14 and will be pushed inwardly to cause the outer tumblers or cylinders 19 and the inner tumblers 20 to assume positions with their engaging ends on the line of cleavage designated 22. At such time, the rotator 14 is free to be rotated from its position in Figure 4 to its opposite position as shown in Figure 5, substantially 180° of movement, due to the unlocking of the tumblers 19 and 20 by the said key. As soon as the tumblers 19 and 20 as shown in Figure 4 are caused to unlock the rotator 14, the latter may be turned as stated and will shift its eccentric throw pin from the dotted line position $x$ in Figure 6 to the dotted line position $y$ in said figure, the movement being in the direction of the arrow $z$ indicated in the same figure. In other words, the movement of the rotator 14 carries the eccentric throw pin 16 by an arcuate movement from the position $x$ to the position $y$, as shown in Figure 6, such action causing a shifting of the slide bolt 12 from the position of Figure 4 to the position of Figure 5. When the parts are in the position of Figure 4, the tumblers 19 and 20 become aligned and may assume their locking condition of Figure 4 as soon as the key 29 is removed. Likewise, when the parts assume the position of Figure 5, the said tumblers 19 and 20 become aligned and may assume their locking condition when the key 29 is removed. But when the throw pin 16 is shifted from either of the extreme positions $x$ and $y$ of Figure 6, it passes upwardly partially out of the recess 17 of the bolt 12, and thereupon the tumblers 19 carried by the rotator 14 and its throw pin 16 become disaligned with respect to the tumblers 20 carried in the recess 18 or tumbler barrel of the bolt 12 and certain tumblers 19 and 20 are maintained under such conditions with their adjacent ends in the plane of cleavage 22 so that locking action of said parts cannot take place. For example, this condition is the one existing when the throw pin 16 assumes the position designated $xx$ in Figure 6, which is the position intermediate its extremes of movement. In such position, the tumblers 19 and 20 are prevented from locking the bolt 12 and by simple pressure on the rotator 14 in either direction it may be turned to the right or left, the former direction to move the bolt 12 toward its operative position and the latter direction to shift the bolt to its inoperative unlocked position.

Of course, when the bicycle is desired to be locked by angling its front wheel on turning the steering post 4, the wheel will be shifted in either angular position desired and one of the notches brought opposite to the lock bolt 12. Thereupon, the lock bolt 12 will be caused to move by the rotator and key 29 to shift it so that its end 12a will engage one of the notches 9 and then the bolt 12 will be in its operative position to lock the front wheel. At the same time if the bicycle is near a post, the chain 27 or any equivalent means engaged with the hook 12b of the lock bolt 12 will be locked against displacement from the bolt in an obvious manner.

If the operator wishes to leave the lock bolt 12 in an unlocked condition, he can cause the key 29 to cooperate with the tumbler mechanism to unlock the bolt 12 preliminarily and then shift the bolt to any position intermediate the extremes at which the throw pin 16 is shown adjusted at $x$ and $y$ in Figure 6, and the bolt will be free then to be pushed to its operative or inoperative positions as desired, by turning the rotator 14.

Obviously, the lock unit of the invention is of the sliding lock bolt type and wherever a sliding lock bolt is found to be useful in the arts, the said lock unit of the invention may be employed. There are conditions, of course, in which the hook end 12b of the bolt could be entirely dispensed with and its locking end 12a depended upon solely for effecting the locking function of the device.

It is notable that the shifting movement of the throw pin 16 is limited in opposite directions by engagement of the same with a portion of the bottom of the casing 11 after the manner which is illustrated in Figure 2. In other words, as the throw pin reaches the limit of its 180° of movement in opposite directions, it abuts with the bottom of the casing 11. It is also notable that when the rotator and locking parts lock the bolt 12 in either of its extreme operative and inoperative positions, the strain of pressure on the bolt to unauthorizedly disturb its locked condition, whether it is held inoperative or operative, is received by the throw pin because of the interfit of the latter in the recess 17 of the bolt 12, and is not received upon the tumbler parts 19 or 20. The last mentioned feature is important because it increases materially the strength of the lock under working conditions.

Having thus described my invention, what I claim as new and desire to secure by Letters Patent of the United States, is:—

1. In a lock unit, in combination, a casing, a lock bolt movably mounted therein, a rotator mounted in the casing, and having a part engaging the lock bolt to shift the same, and lock mechanism comprising a single set of coacting parts upon the rotator and the said bolt for holding the bolt in either of two predetermined positions.

2. A lock unit as set forth in claim 1, wherein certain parts of the lock mechanism are mounted in the part of the rotator which engages the bolt for shifting movement of the latter, and wherein said bolt engaging part is disposed eccentric to the rotator.

3. In a lock unit, a casing, a lock bolt movable in the casing, a rotator mounted on the casing, and provided with an eccentric throw pin interengaging the lock bolt to shift the latter, and lock mechanism comprising tumbler members carried by the lock bolt, and other tumbler members carried by the rotator and its eccentric throw pin operable for locking said lock bolt in an operative position, the eccentric throw pin being movable upon an arc and in a direction rectilinear to the line of movement of the lock bolt so that when the throw pin is shifted in a direction out of line with the direction of movement of the lock bolt the tumbler parts on the rotator and throw pin, and those upon the lock bolt, will be prevented from coacting and thus prevented from locking said bolt against movement.

4. A lock unit adapted to be mounted upon a supporting frame and comprising a lock bolt for cooperation to engage and disengage a part to be locked, lock mechanism for holding said lock bolt in operative locking position, said lock bolt having a portion to coact directly with the part to be engaged thereby in the locking action and also provided with another locking member shiftable therewith to an operative locking position to coact with fastening means adapted to pass around a post or like anchoring member.

5. The combination of parts as claimed in claim 4, in which the last mentioned locking member comprises a hook carried by the lock bolt at an end thereof, said lock unit comprising a casing with which the hook coacts to lock the fastening means when the hook is moved to a position near the casing and to unlock said fastening means when the hook is moved to a position substantially spaced from the casing.

6. In a lock unit, in combination, a casing, a slide bolt mounted therein, an actuator for said bolt comprising a rotator swivelled in the casing and having an eccentric throw pin projecting therefrom into engagement with the slide bolt, means whereby the rotator may be turned so as to cause the throw pin thereof to move on an arc for shifting the slide bolt, and lock mechanism for holding the rotator against movement and comprising locking tumblers mounted upon the lock bolt and upon the rotator's throw pin for coaction to hold the bolt in an operative position.

7. In a lock unit, in combination, a casing, a slide bolt mounted therein, an actuator for said bolt comprising a rotator swivelled in the casing and having an eccentric throw pin projecting therefrom into engagement with the slide bolt, means whereby the rotator may be turned so as to cause the throw pin thereof to move on an arc for shifting the slide bolt, and lock mechanism for holding the rotator against movement, and comprising locking tumblers mounted upon the lock bolt and upon the rotator's throw pin for coaction to hold the bolt in an operative position, said bolt comprising an engaging member for locking purposes, located at one end thereof, and being equipped with a locking hook at its opposite end cooperative with the casing to become closed thereby when the bolt is in a certain position.

8. In a lock of the class described, in combination, a casing, a rotator mounted therein, an eccentric throw pin carried by said rotator, a sliding lock bolt adjacent to the rotator and having a recess receiving the eccentric throw pin so that the latter is movable on an arc from a position aligned with the bolt in its recess to swing partly out of the recess and then back into the same in alignment with the bolt, a tumbler unit carried by the eccentric throw pin and shiftable on an arc therewith in relation to the lock bolt, and a second tumbler unit on the bolt moving therewith to and from a position of alignment with the first mentioned tumbler unit.

SOLOMON WISE.